United States Patent
Kherani et al.

(10) Patent No.: US 9,374,769 B2
(45) Date of Patent: Jun. 21, 2016

(54) ENHANCED HIGHER PRIORITY PUBLIC LAND MOBILE NETWORK (HPPLMN) SEARCH

(71) Applicant: Broadcom Corporation, Irvine, CA (US)

(72) Inventors: Arzad Kherani, Bangalore (IN); Anand Devidas Kashikar, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 6 days.

(21) Appl. No.: 13/706,009

(22) Filed: Dec. 5, 2012

(65) Prior Publication Data

US 2014/0155061 A1    Jun. 5, 2014

(51) Int. Cl.
*H04W 48/16* (2009.01)

(52) U.S. Cl.
CPC ..................... *H04W 48/16* (2013.01)

(58) Field of Classification Search
CPC ..... H04W 24/10; H04W 28/08; H04W 48/18; H04W 48/16; H04W 36/0083; H04W 36/0088; H04W 36/08; H04W 36/14; H04W 48/66
USPC ......... 455/426.1, 464.4, 440–456.2, 26.1, 62, 455/132, 150.1, 160.1, 161.1, 151.1, 151.2, 455/192.1, 200.1, 205, 216, 227, 230, 254; 405/502
See application file for complete search history.

(56) References Cited

U.S. PATENT DOCUMENTS

| | | | | |
|---|---|---|---|---|
| 2005/0221846 A1* | 10/2005 | Jansen | ......................... | 455/502 |
| 2007/0042775 A1* | 2/2007 | Umatt et al. | .................. | 455/434 |
| 2007/0211669 A1* | 9/2007 | Umatt et al. | .................. | 370/335 |
| 2008/0057948 A1* | 3/2008 | Mittal et al. | ............... | 455/426.1 |
| 2008/0108346 A1* | 5/2008 | Umatt et al. | ............... | 455/432.1 |
| 2009/0163204 A1* | 6/2009 | Farnsworth et al. | .......... | 455/434 |

FOREIGN PATENT DOCUMENTS

CN     101977421 A  *  2/2011

* cited by examiner

*Primary Examiner* — Lester Kincaid
*Assistant Examiner* — Gary Lafontant
(74) *Attorney, Agent, or Firm* — Sterne, Kessler, Goldstein & Fox P.L.L.C.

(57) ABSTRACT

Embodiments provide an enhanced approach for Higher Priority Public Land Mobile Network (HPPLMN) search. In one embodiment, information acquired during a search (for each detected cell per frequency channel) is saved in a database and persisted in the database based on a validity time. An idle mode-to-connected mode transition by the UE, rather than aborting the search, only suspends the search for it to be resumed at a later time upon a connected mode-to-idle mode transition by the UE. Saved search data that is valid at the time of the transition is maintained and the frequency channel(s) associated with it is not re-searched in the current search. In an embodiment, the search is resumed based on weights that are associated with frequency channels, where a weight indicates a priority for visiting the frequency channel.

20 Claims, 5 Drawing Sheets

ENHANCED HIGHER PRIORITY PUBLIC LAND MOBILE NETWORK (HPPLMN) SEARCH

FIELD OF THE INVENTION

The present disclosure relates generally to frequency channel search in mobile devices.

BACKGROUND

Background Art

In the 3G Long Term Evolution (LTE) protocol, when a User Equipment (UE) is camped on a Visited Public Land Mobile Network (VPLMN), the UE periodically performs a search for a higher priority PLMN (HPPLMN) during idle mode periods of the UE. Specifically, the UE performs the HPPLMN search during DRx (Discontinuous Reception) inactivity periods, which are coordinated periods of time during which the UE is idle and is free to not monitor a downlink control channel from the evolved NodeB (eNB) (base station) (the eNB does not schedule any downlink transmissions to the UE during DRx inactivity periods).

Conventionally, the HPPLMN search is interrupted and aborted frequently due to uplink data generated by upper layers of the UE protocol stack and/or incoming downlink data to the UE, which cause the UE to transition from the idle mode to a connected mode. This results in the HPPLMN search causing significant power consumption in the UE, often without fully terminating, and the UE remaining camped on a lower priority PLMN.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Figure 1:
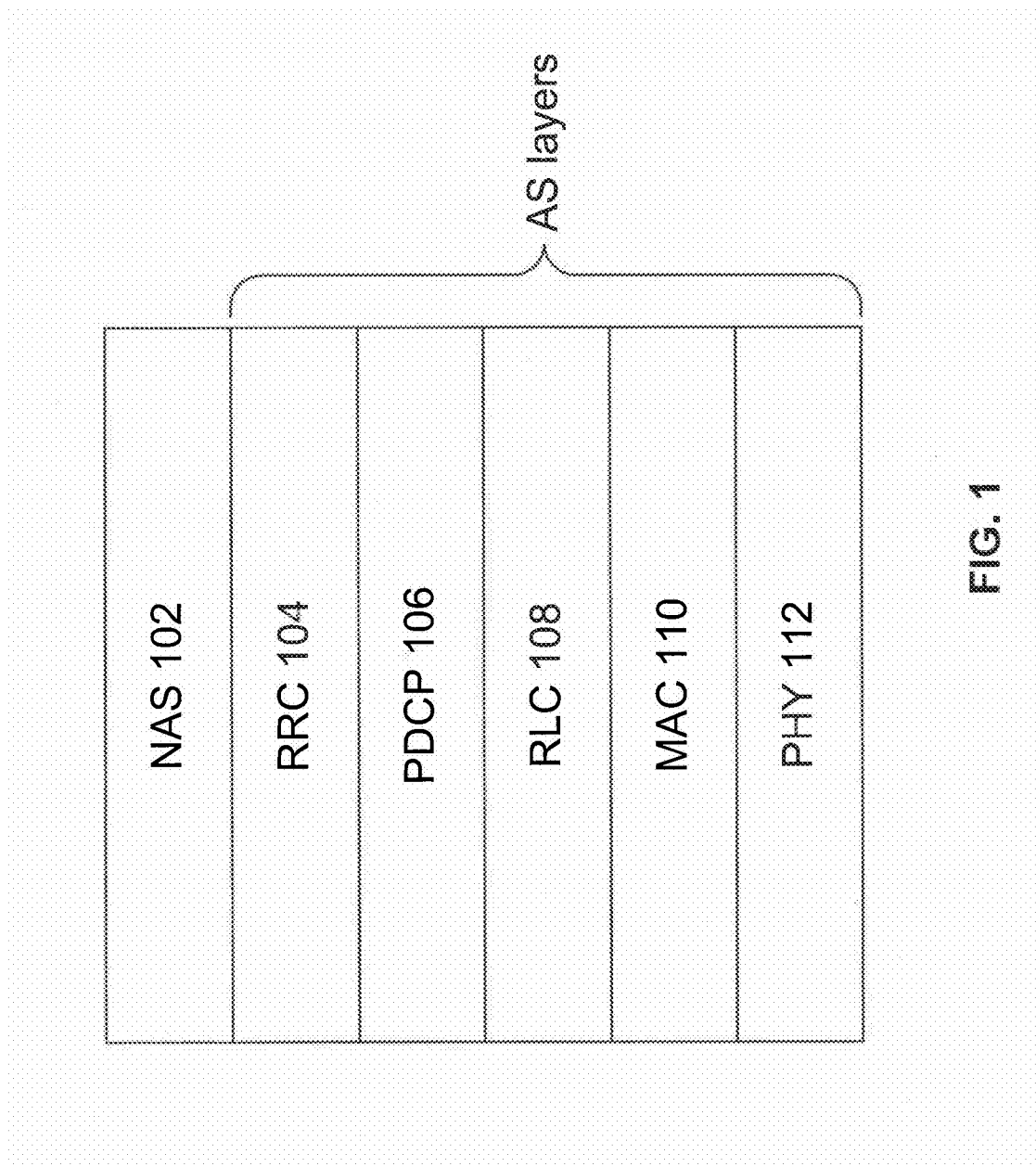
FIG. 1 illustrates the Long Term Evolution (LTE) protocol stack.

FIG. 1 illustrates the Long Term Evolution (LTE) protocol stack. As shown in FIG. 1, the LTE protocol stack includes a non-access stratum (NAS) layer 102, a radio resource control (RRC) layer 104, a packet data convergence protocol (PDCP) layer 106, a radio link control (RLC) layer 108, a medium access control (MAC) layer 110, and a physical (PHY) layer 112. The LTE protocol stack shown in FIG. 1 is typically implemented on a user equipment (UE) (mobile terminal).

RRC layer 104, PDCP layer 106, RLC layer 108, MAC layer 110, and PHY layer 112 are considered access stratum (AS) layers, which handle functions related to the transmission of data over the radio interface and the management of the radio interface of the UE. Specifically, one function of the AS layers includes supporting Public Land Mobile Network (PLMN) selection by the NAS layer 102 by searching for and reporting available PLMNs to NAS layer 102.

NAS layer 102 maintains a list of allowed PLMN types (e.g., LTE, GSM, etc.) and a list of PLMN identities in priority order. NAS layer 102 uses the two lists to select a PLMN for the UE to camp on. A Home PLMN (HPLMN) (a PLMN with a Mobile Country Code (MCC) and a Mobile Network Code (MNC) that match the MCC and MNC of the International Mobile Subscriber Identity (IMSI) associated with the UE) is typically given the highest priority and camped on by the UE whenever available. A PLMN that is not the HPLMN and that is camped on by the UE is called a Visited PLMN (VPLMN).

When the UE is camped on a VPLMN, the UE periodically performs a search for a higher priority PLMN (HPPLMN) during idle mode periods of the UE. More specifically, the UE performs the HPPLMN search during DRx (Discontinuous Reception) inactivity periods, which are coordinated periods of time during which the UE is idle and is free to not monitor a downlink control channel from the evolved NodeB (eNB) (base station) (the eNB does not schedule any downlink transmissions to the UE during DRx inactivity periods).

Typically, NAS layer 102 maintains a HPPLMN search timer that triggers a HPPLMN search by the AS layers during DRx inactivity periods. When the HPPLMN search timer expires, NAS layer 102 sends a command to RRC layer 104 to begin the HPPLMN search. RRC layer 104 manages the HPPLMN search to coincide with one or more DRx inactivity periods.

For each radio access technology (RAT) supported by the UE (and/or as determined by NAS layer 102), RRC layer 104 in conjunction with PHY layer 112 search all supported frequency bands and corresponding frequency channels for the RAT. In LTE, each frequency channel is defined by a number known as EARFCN (E-UTRA Absolute Radio Frequency Channel Number). In the following, the term EARFCN is used to describe a frequency channel.

Typically, RRC layer 104 maintains for each supported RAT a list of supported frequency bands and corresponding EARFCNs within each frequency band. Conventionally, for each RAT being searched, RRC layer 104 configures PHY layer 112 sequentially for all known EARFCNs (in one implementation, RRC layer 104 begins by searching the EARFCN corresponding to a center frequency of a frequency band before sweeping across the complete bandwidth in a determined order). For each EARFCN being searched, PHY layer 112 performs measurements to detect radio cells (cells)

available on the searched EARFCN. Cells may or may not be detected on a given EARFCN.

PHY layer 112 reports detected cells, if any, to RRC layer 104. For a detected cell (e.g., strongest cell), RRC layer 104 may ask PHY layer 112 to decode information contained in a broadcast channel of the cell to determine the PLMN identity of the cell. RRC layer 104 then sends the determined PLMN identity to NAS layer 102, which uses the determined PLMN identity in its PLMN selection process.

Figure 2:
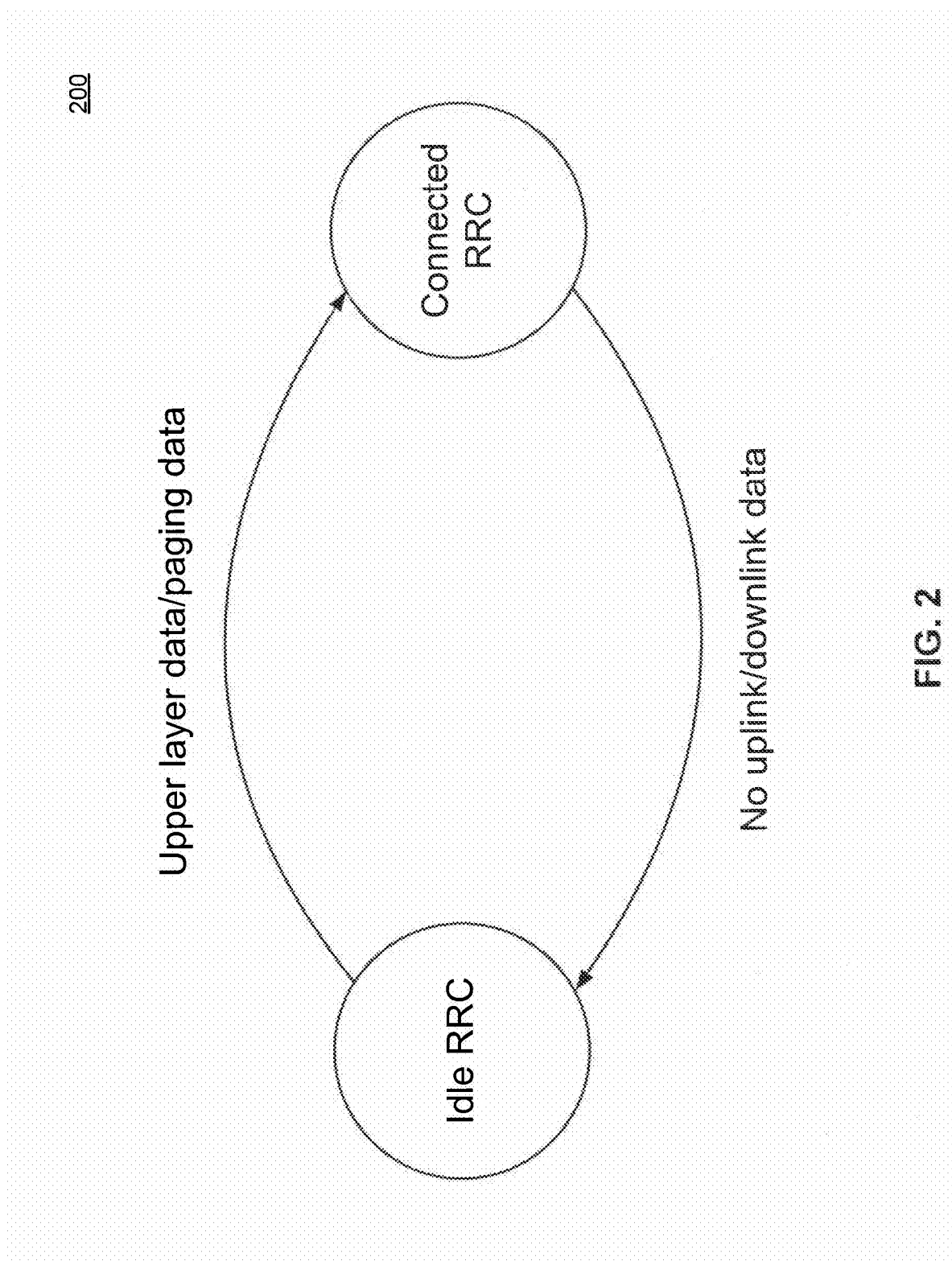
FIG. 2 is a state diagram of the radio resource control (RRC) layer of the LTE protocol stack.

Generally, the search of an EARFCN to identify the PLMN identity list of a detected cell may take up to 150 msec to complete. A full HPPLMN search to identify all detected cells for every known EARFCN (e.g., over a couple of supported RATs, with approximately 600 EARFCNs per RAT) may take up to 3 minutes to complete. As a result, there is high likelihood that either uplink data will be generated by upper layers of the UE stack (e.g., applications on the UE) or downlink data will be received (e.g., paging data notifying the UE of incoming data) during a HPPLMN search. Such events cause the UE to transition from the idle mode to a connected mode. More specifically, RRC layer 104, which manages the HPPLMN search, transitions from an idle RRC state to a connected RRC state as depicted by RRC state diagram 200 shown FIG. 2.

Conventionally, the idle mode-to-connected mode transition by the UE (and RRC layer 104) causes the HPPLMN search being conducted to be aborted and any information (e.g., decoded PLMN information) acquired during the search to be lost. As a result, when the UE retards subsequently to idle mode, NAS layer 102 triggers a new HPPLMN search over all supported RATs and corresponding frequency bands. Again, generated uplink data and/or received downlink data may cause the search to be aborted and a new subsequent search to be triggered at a later time when RRC layer 104 returns to idle mode. For example, in smart phones and tablets, uplink data is generated periodically (e.g., ping packets to server) such that the HPPLMN search is aborted frequently without being able to fully terminate. As a result, the UE (particularly RRC layer 104 and PHY layer 112) spends large amounts of time and power trying to complete the HPPLMN search. Further, because the UE may not fully complete the HPPLMN search, the UE may remain camped on a lower priority PLMN than a higher priority PLMN, such as the HPLMN.

Embodiments provide an enhanced HPPLMN approach. In one embodiment, information acquired during a search (for each detected cell per EARFCN) is saved in a database by the RRC layer. In one embodiment, saved search data (e.g., including identified PLMNs) is linked to a serving cell location identifier (which can be a combination of Physical Cell Identity (PCI) and EUTRAN Cell Global Identity (ECGI)), which identifies the cell that it belongs to. In an embodiment, saved search data is persisted (maintained) in the database based on a validity time associated with the data. In an embodiment, the validity time is a function of a mobility state of the UE, such that saved search data is persisted longer when the UE is less mobile. In another embodiment, saved search data is aged by accounting for time spent in connected mode between idle mode-to-connected mode and connected mode-to-idle mode transitions. Other indicators for determining the validity of saved search data can also be used, including information regarding the cell(s) camped on by the UE before transitioning to connected mode and after returning to idle mode.

According to embodiments, an idle mode-to-connected mode transition by the UE, rather than aborting the search, only suspends the search for it to be resumed at a later time upon a connected mode-to-idle mode transition by the UE. In an embodiment, saved search data that is valid at the time of the transition is maintained and the EARFCN(s) associated with it is not re-visited in the current search. In an embodiment, the search is resumed based on weights that are associated with EARFCNs, where an EARFCN weight indicates a priority for visiting (searching/re-searching) the EARFCN. For example, an EARFCN that has not been searched before can be assigned the highest weight possible such that it is visited early upon resuming the search. A previously searched EARFCN can be assigned a low weight such that it is re-visited only after higher weight EARFCNs are visited. As a result, the HPPLMN search can be completed with a high probability despite frequent transitions from the idle mode to the connected mode by the UE.

Example embodiments will now be described. These example embodiments are provided for the purpose of illustration only and are not limiting. Generally, the example embodiments described herein are performed by the AS layers of the UE, including the RRC and PHY layers.

Figure 3:
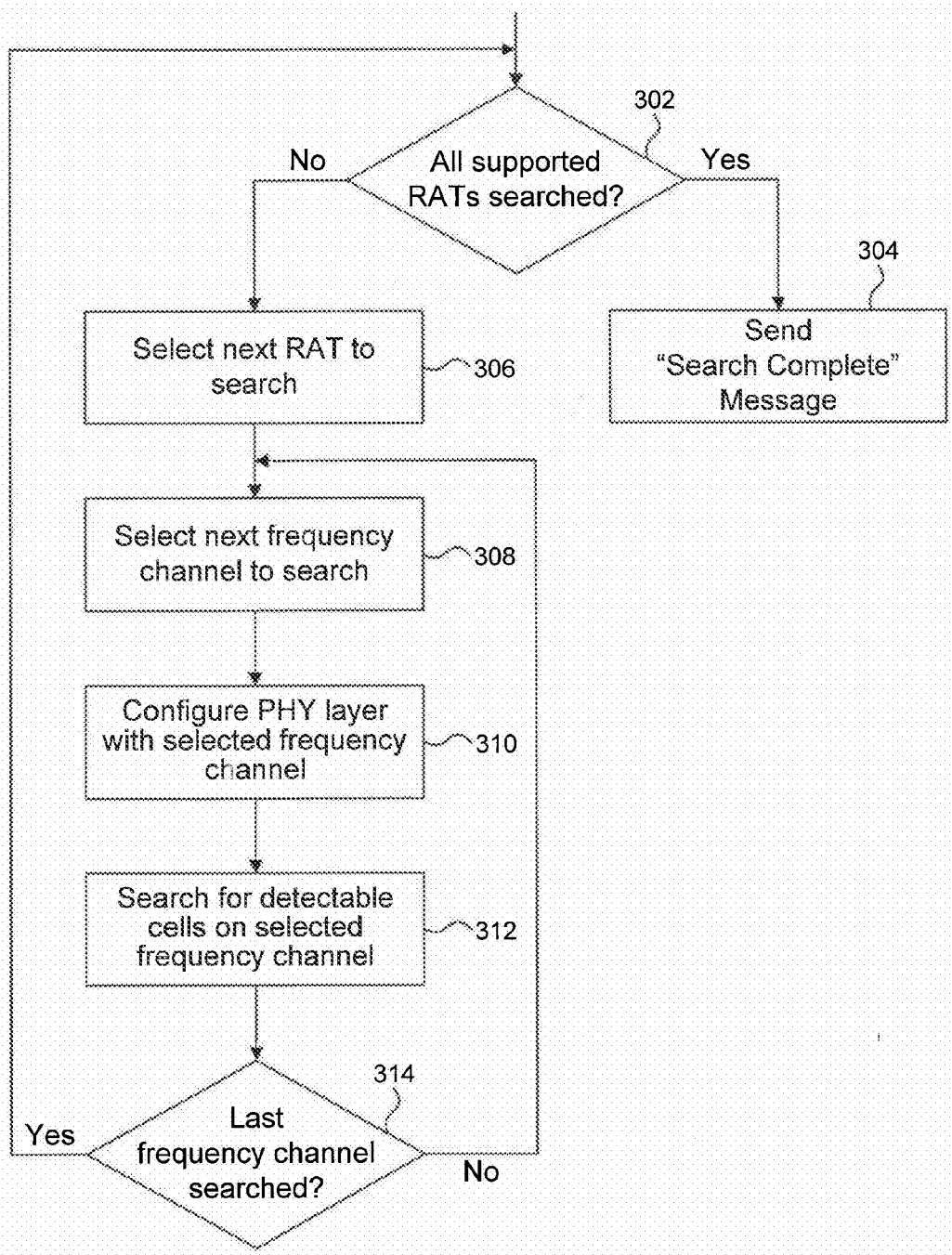
FIG. 3 is a flowchart of an example process for performing a Higher Priority Public Land Mobile Network (HPPLMN) search according to an embodiment.

FIG. 3 is a flowchart of an example process 300 for performing a HPPLMN search according to an embodiment. Example process 300 may be performed by the RRC layer, the PHY layer, and the NAS layer of a LTE protocol stack, and may be triggered by the NAS layer of the LTE protocol stack. As described above, the HPPLMN search is initiated while the UE is in idle mode and performed during DRx inactivity periods.

As shown in FIG. 3, process 300 begins in step 302, which includes determining whether or not all supported RATs in the UE have been searched in a current HPPLMN search. Step 302 is typically performed by the RRC layer of the LTE protocol stack, which maintains a list of RATs supported by the UE. The supported RATs may be maintained in a priority order and searched according to this priority order. In an embodiment, the RRC layer begins by searching on the highest priority RAT. After completing the search on the highest priority RAT, the RRC layer receives a request from the NAS layer to search on the next highest priority RAT. This process completes until all supported RATs have been searched.

If all supported RATs have been searched in step 302, then process 300 proceeds to step 304, which includes sending a "search complete" message from the RRC layer to the NAS layer. This completes the current HPPLMN search. Otherwise, process 300 proceeds to step 306, which includes selecting the next RAT to search. As described above, the RAT search order may be according to a priority order maintained by the RRC layer.

Process 300 then proceeds to step 308, which includes selecting a next frequency channel (EARFCN) to search. In an embodiment, for each supported RAT, the RRC layer maintains a list of all supported frequency bands and corresponding EARFCNs. In an embodiment, step 308 includes selecting the next EARFCN to search based on respective weights associated with the EARFCNs of the RAT, where an EARFCN weight indicates a priority for visiting (searching/re-searching) the EARFCN For example, an EARFCN that has not been searched before can be assigned the highest weight possible such that it is visited early upon starting/resuming the search. A previously searched EARFCN can be assigned a low weight such that it is re-visited only after higher weight EARFCNs are visited. In an embodiment, step 308 includes selecting the EARFCN with the highest weight among all EARFCNs.

In an embodiment, the weight given to an EARFCN is a function of a respective last visit time associated with the EARFCN. In another embodiment, the EARFCN weight is a function of a difference between the respective last visit time associated with the EARFCN and a respective threshold associated with the EARFCN. The EARFCN selected in step 308 corresponds to the EARFCN with the most negative difference among all EARFCNs.

Once an EARFCN is selected in step 308, process 300 proceed to step 310, which includes configuring the PHY layer with the selected EARFCN. In an embodiment, step 310 is performed by the RRC layer, which configures the PHY layer to search the selected EARFCN in a next DRx inactivity period.

Subsequently, in the next DRx inactivity period, process 300 proceeds to step 312, which includes searching for detectable cells on the selected EARFCN. In an embodiment, step 312 includes the PHY layer performing signal measurements to detect cells available on the selected EARFCN. In an embodiment, a cell is detected if a received signal from the cell is stronger than a predetermined signal strength threshold. Cells may or may not be detected on the selected EARFCN, depending, among other factors, on the location of the UE. If one or more cells are detected on the selected EARFCN, the PHY layer reports the detected cells to the RRC layer. In an embodiment, the PHY layer reports a physical layer cell identifier for each detected cell to the RRC layer.

Subsequently, the RRC layer selects one of the detected cells (e.g., strongest detected cell) reported by the PHY layer and requests that the PHY layer decode the Physical Broadcast Channel (PBCH) of the selected cell to retrieve the MIB (Master Information Block) of the selected cell. The PHY layer decodes the PBCH and sends the MIB data to the RRC, which allows the RRC to determine the downlink bandwidth and PHICH (Physical Hybrid-ARQ Indicator Channel) parameters needed to decoded the SIB1 (System Information Block 1) of the selected cell. The RRC then instructs the PHY layer to synchronize itself with the selected cell and decode the SIB1 of the selected cell. The PHY layer decodes the SIB1 of the selected cell and sends the SIB1 data to the RRC layer. The SIB1 data includes a PLMN identity list of PLMN(s) available on the selected cell. The RRC layer saves in a database the MIB and/or SIB1 data associated with the selected cell. In an embodiment, the saved search data is linked to a serving cell location identifier (which can be a combination of Physical Cell Identity (PCI) and EUTRAN Cell Global Identity (ECGI)), which identifies the selected cell. The RRC layer then sends the PLMN identity list of the selected cell to the NAS layer.

In an embodiment, the above described process can be repeated for any number of detected cells on the selected EARFCN. For example, as described further, in an embodiment, the number of detected cells that are decoded is based on a search depth associated with the EARFCN. The search depth may be based on the visit history of the EARFCN (e.g., number of times that the EARFCN has been visited within a time period, number of previously detected cells on the EARFCN, etc.).

After completing the search on the selected EARFCN in step 312, process 300 proceeds to step 314, which includes determining, whether or not the selected EARFCN corresponds to the last EARFCN to he searched in the current HPPLMN search for the current RAT. If the answer to step 314 is no, process 300 returns to step 308. where a next EARFCN is selected as described above. Otherwise, process 300 returns to step 302, wherein as described above either a next RAT is selected to be searched or the HPPLMN search terminates if all RATs have been searched in the current HPPLMN search.

In an embodiment, if an idle mode-to-connected mode transition by the UE is necessitated (e.g., uplink data ready for transmission, downlink data waiting to be received), the RRC layer suspends the search and transitions itself to the connected mode. Any search data saved in the database is persisted in the database so long that a validity time associated with the data has not expired. In an embodiment, the validity time is a function of a mobility state of the UE, such that saved search data is persisted longer when the UE is less mobile. In another embodiment, the saved search data is aged by accounting for time spent in connected mode between idle mode-to-connected mode and connected mode-to-idle mode transitions. Other indicators for determining the validity of saved search data can also be used, including information regarding the cell(s) camped on by the UE before transitioning to connected mode and after returning to idle mode. For example, if the cell camped on by the UE before transitioning to connected mode is the same as the cell camped on by the UE after returning to idle mode and if the UE has not completed any handover meanwhile, then it can be assumed that the UE has not moved significantly and that any saved search data is still valid (the EARFCNs that correspond to the saved searched data are thus not re-searched when the HPPLMN search resumes).

When the UE returns to the idle mode, the HPPLMN search can be resumed according to embodiments with any valid saved search data maintained in the database. In an embodiment, the RAT being searched at the time that the search is suspended is saved, and thus the search can be resumed for the same RAT when the UE returns to the idle mode. In an embodiment, referring to FIG. 3, the search resumes from step 308 by selecting a next EARFCN to search using the respective weights associated with the EARFCNs. Thus, in an embodiment, the search is resumed by searching the EARFCN with the highest weight at the time that search is resumed.

Figure 4:
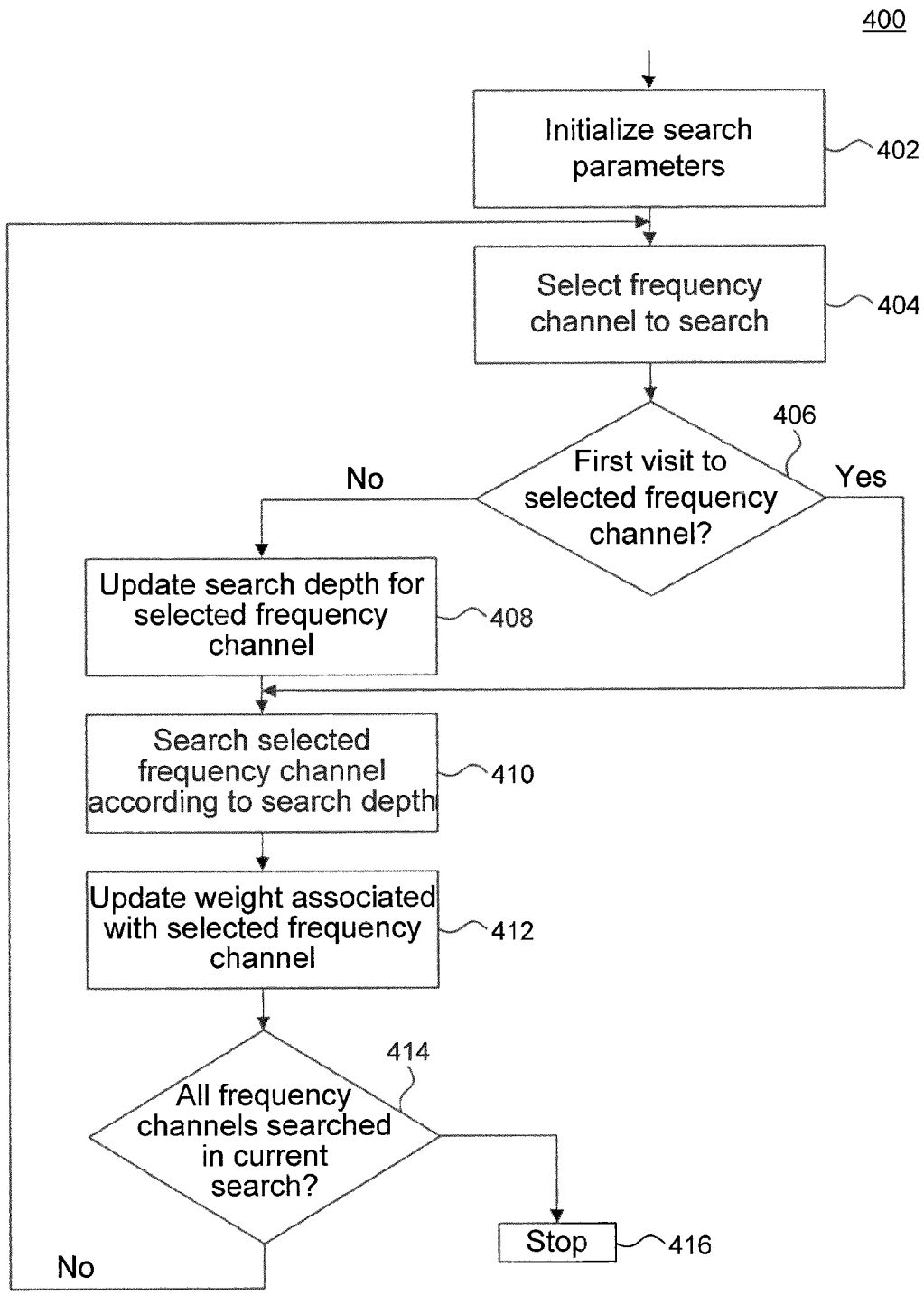
FIG. 4 is a flowchart of another example process for performing a HPPLMN search according to an embodiment.

FIG. 4 is a flowchart of another example process 400 for performing a HPPLMN search according to an embodiment. Example process 400 may be performed by the RRC layer and the PHY layer of a LTE protocol stack, and may be triggered by the NAS layer of the LTE protocol stack. As described above, the HPPLMN search is initiated while the UE is in idle mode and performed during DRx inactivity periods.

Example process 400 corresponds to a HPPLMN search over a single RAT and can be repeated to search over multiple RATs. As shown in FIG. 4, process 400 begins in step 402, which includes initializing search parameters. In an embodiment, a number of parameters are associated with and maintained for each EARFCN in the list of EARFCNs to be searched. The parameters determine the weights for the EARFCNs and govern the order in which EARFCNs are visited and/or revisited. Some of the parameters are maintained intra-HPPLMN search (within a single HPPLMN search) and are re-initialized at the beginning of each new HPPLMN search, while other parameters are maintained inter-HPPLMN search (over multiple HPPLMN searches).

In an embodiment, the following parameters are maintained for an EARFCN "f".

Last visit time: $L_f$
Number of cells to be searched on EARFCN (search depth): $N_f$
Number of idle-connected-idle cycles since last visit to EARFCN: $C_f$
Time spent in the current connected mode (if any): $Z_f$
Threshold for revisit to EARFCN: $T_f$ Number of times the EARFCN has been searched (visited): $V_f$ When the HPPLMN search starts, in an embodiment, the above parameters are initialized as follows for every EARFCN:

$L_f$=current time
$N_f$=2
$C_f$=0
$Z_f$=0
$T_f$=720/(Number of EARFCNs in Band/Minimum Bandwidth in Band)
$V_f$=0

Next, step 404 includes selecting a frequency channel (EARFCN) to search. In an embodiment, as described above, step 404 thus includes selecting the next EARFCN to search based on respective weights associated with the EARFCNs, where an EARFCN weight indicates a priority for visiting (searching/re-searching) the EARFCN.

In an embodiment, the weight given to an EARFCN (f) is a function of $L_f$ and/or $T_f$. In another embodiment, the weight is a function of a difference between $L_f$ and $T_f$. Specifically, the EARFCN selected in step 404 corresponds to the EARFCN with the largest lag of $L_f$ with respect to $T_f$. In an embodiment, this selection criteria is used intra-HPPLMN search (e.g., across an idle-connected-idle cycle during which the search is suspended and then resumed) or inter-HPPLMN search (across multiple HPPLMN searches). In an embodiment, if two or more EARFCNs are tied with respect to this selection criterion, then additional criteria can be used. For example, the number of visits to an EARFCN ($V_f$) can be used to give higher search priority to EARFCNs that have been visited less frequently in the past. As a final tie breaker, the EARFCN value can be used. For example, lower valued EARFCNs are searched before higher valued EARFCNs.

After selecting an EARFCN to search, process 400 proceeds to step 406, which includes determining whether the current visit to the selected EARFCN corresponds to the first visit to the EARFCN. In an embodiment, step 406 includes checking the $V_f$ parameter associated with the selected EARFCN, which is maintained across HPPLMN searches. If the answer to step 406 is yes, process 400 proceeds to step 410, skipping step 408. Otherwise, process 400 proceeds to step 408.

Step 408 includes updating a search depth associated with the selected EARFCN, where the search depth indicates a maximum number of cells to decode from cells detected on the EARFCN. In an embodiment, the search depth is set to a constant (e.g., 2) at the beginning of the very first HPPLMN search. Subsequently, each time the EARFCN is re-visited, the search depth is increased or decreased depending on the number of cells previously detected on the EARFCN. In an embodiment, the search depth is increased if a number of detected cells in a previous search (visit) of the EARFCN is greater than the search depth currently associated with the EARFCN, and decreased if the number of detected cells in the previous search of the EARFCN is lower than the search depth current associated with the EARFCN.

In an embodiment, the search depth of an EARFCN is given by the parameter $N_f$ of the EARFCN. $N_f$ is set to a constant at the beginning of the very first HPPLMN search. Subsequently, in an embodiment, every time the EARFCN is revisited for search, $N_f$ is increased by a constant β (e.g., β=2) with a probability p (e.g., p=0.5) if more than $N_f$ cells were detected in the previous search of the EARFCN and decreased by β (while keeping a lower limit on $N_f$, e.g., 2) otherwise.

Subsequently, process 400 proceeds to step 410, which includes searching the selected EARFCN according to the search depth associated with the EARFCN. As such, step 410 first includes searching for detectable cells on the selected EARFCN. As described above, in an embodiment, this includes the PHY layer performing signal measurements to detect cells available on the selected EARFCN. In an embodiment, a cell is detected if a received signal from the cell is stronger than a predetermined signal strength threshold. Cells may or may not be detected on the selected EARFCN, depending, among other factors, on the location of the UE.

If one or more cells are detected on the selected EARFCN, the PHY layer reports the detected cells to the RRC layer. In an embodiment, the PHY layer reports a physical layer cell identifier for each detected cell to the RRC layer. Subsequently, the RRC layer selects one of the detected cells (e.g., strongest detected cell) reported by the PHY layer and requests that the PHY layer decode the Physical Broadcast Channel (PBCH, of the selected cell to retrieve the MIB (Master Information Block) of the selected cell.

The PHY layer decodes the PBCH and sends the MIB data to the RRC, which allows the RRC to determine the downlink bandwidth and PHICH (Physical Hybrid-ARQ Indicator Channel) parameters needed to decoded the SIB1 (System Information Block 1) of the selected cell. The RRC then instructs the PHY layer to synchronize itself with the selected cell and decode the SIB1 of the selected cell. The PHY layer decodes the SIB1 of the selected cell and sends the SIB1 data to the RRC layer. The SIB1 data includes a PLMN identity list of PLMN(s) available on the selected cell. The RRC layer saves in a database the MIB and/or SIB1 data associated with the selected cell. In an embodiment, the saved search data is linked to a serving cell location identifier (which can be a combination of Physical Cell Identity (PCI) and EUTRAN Cell Global Identity (ECGI)), which identifies the selected cell. The RRC layer then sends the PLMN identity list of the selected cell to the NAS layer.

The RRC then requests that the PHY layer repeat the search process for another detected cell, if any, up to the search depth currently associated with the EARFCN. When the EARFCN has been searched according to the EARFCN search depth in step 410, process 400 proceeds to step 412, which includes updating the weight associated with the EARFCN. This ensures that the EARFCN is re-visited only after other EARFCNs with higher visit weights are searched. In an embodiment, step 412 includes updating the last visit time $L_f$ associated with the EARFCN to the current time and updating the threshold for revisit $T_f$ to the EARFCN. In an embodiment, $T_f$ is updated by adding a pre-determined constant $\Delta_3$ to it ($T_f=T_f+\Delta_3$). In an embodiment, $\Delta_3$ is equal to 720/(Number of EARFCNs in Band/Minimum Bandwidth in Band).

Then, process 400 proceeds to step 414, which includes determining whether or not all EARFCNs for the selected RAT have been searched in the current HPPLMN search. If not, process 400 returns to step 404 to select a next EARFCN to search. Otherwise, process 400 terminates in step 416.

Figure 5:
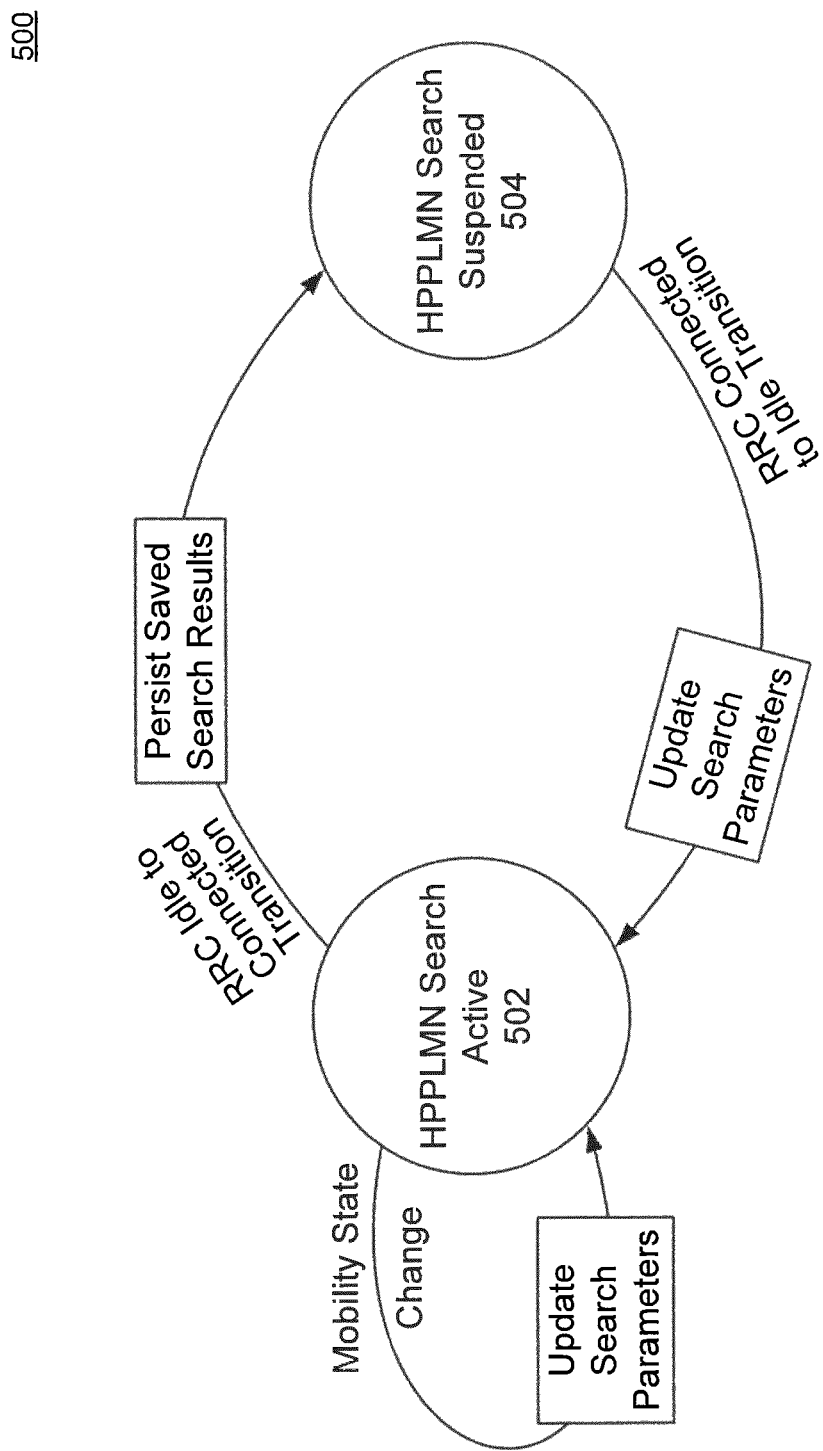
FIG. 5 is an example state diagram of a HPPLMN search according to an embodiment.

FIG. 5 is an example state diagram 500 that represents a HPPLMN search according to an embodiment. Example state diagram 500 is provided for the purpose of illustration only and is not limiting of embodiments. As shown in FIG. 5, example state diagram 500 includes two states, a HPPLMN search active state 502 and a HPPLMN search suspended state 504. In other embodiments, example state diagram 500 may include additional states, such as a HPPLMN search complete state, for example.

HPPLMN search active state 502 corresponds to the HPPLMN search being ongoing. As described above, in this state, the UE and the RRC layer are in idle mode. During DRx inactivity periods, the RRC layer controls the PHY layer to sequentially search EARFCNs of the selected RAT according to an order determined by respective weights associated with the EARFCNs. Search results (e.g., decoded PLMN identity list) are saved for each visited EARFCN by the RRC layer.

While in state 502, an idle mode-to-connected mode transition within the UE can be detected (e.g., due to uplink data being generated by upper layers and/or paging data being received notifying of incoming data to the UE), which causes the RRC layer to transition from idle mode to connected mode. This causes the HPPLMN search to transition from HPPLMN search active state 502 to HPPLMN search suspended state 504.

In an embodiment, a HPPLMN search active to a HPPLMN search suspended state transition does not cause earlier search results to be lost. Instead, saved search results for a previously searched EARFCN (e.g., PLMN identity list) are persisted in a database according to a validity time associated with them. The saved search results are considered valid, and the EARFCN is not re-visited when the search is resumed, as long as the validity time associated with the saved search results is later than the current time. In another embodiment, the EARFCN is not re-visited when the search is resumed if the saved search results for the EARFCN are valid, the UE has not completed any handovers (during the time that the HPPLMN search was suspended), and/or a cell camped on by the UE after returning to idle mode is the same as the cell camped on by the UE before transitioning from idle mode to connected mode.

Subsequently, when the UE and the RRC layer return from connected mode to idle mode, the HPPLMN search transitions from HPPLMN search suspended state 504 to HPPLMN search active state 502, which allows the HPPLMN search to resume. In an embodiment, before the HPPLMN search is resumed, search parameters are updated to account for the time spent by the UE in connected mode. In an embodiment, this is performed by updating the threshold for revisit $T_f$ for previously searched EARFCNs, for example by increasing $T_f$ by $Z_f$ (up to the $T_f$ initialization value), which represents the time spent in connected mode (or HPPLMN search suspended state 504) ($T_f=T_f+Z_f$).

In an embodiment, the HPPLMN search dynamics are tied to a mobility state of the UE such that EARFCNs are searched and saved search results are aged according to the mobility state of the UE. For example, in an embodiment, if the UE is highly mobile, EARFCNs are re-visited more frequently and saved search results are expired more rapidly (by being given a shorter validity time). If the UE is less mobile or immobile, EARFCNs are re-visited less frequently and saved search results are persisted for a long time, especially if the UE undergoes no handovers.

In an embodiment, a mobility state is defined and tracked for the UE. For example, the mobility state may be one of low mobility, medium mobility, and high mobility. Various approaches can be used to track the mobility of the UE including handover patterns by the UE and/or mobility detectors within the UE. The mobility state of the UE can be tracked by the UE itself and/or by a base station. Periodically, the mobility state of the UE is checked to determine if it has changed. If a mobility state change is detected while the HPPLMN search is ongoing, search parameters may be updated accordingly. The HPPLMN search is not suspended to update the search parameters due to a mobility state change.

In an embodiment, a mobility state change results in a change in the validity time value associated with saved search results. For example, an increase in mobility leads to a shorter validity time such that saved search results age more rapidly. Conversely, a decrease in mobility leads to a longer validity time such that saved search results are persisted longer. In another embodiment, a mobility state change affects the frequency at which EARFCNs are re-visited. For example, in an embodiment, the threshold for revisit $T_f$ for previously searched EARFCNs is increased (up to the $T_f$ initialization value) or decreased (up to a floor value) based on the current mobility state of the UE. In an embodiment, $T_f$ is updated according to $T_f=T_f-a_i\Delta_1$, where $a_i$ is an integer that depends on the mobility state and $\Delta_1$ is a constant.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method for performing a search over a plurality of frequency channels in a device, comprising:
    selecting a frequency channel from the plurality of frequency channels according to an order determined by respective weights associated with the plurality of frequency channels, wherein the respective weight for a frequency channel increases with increasing time that has elapsed since the frequency channel was last searched;
    searching the selected frequency channel for detectable cells; and
    updating weight associated with the selected frequency channel in response to said searching;
    wherein each weight of the respective weights is based on a difference between the increasing time that has elapsed since the corresponding frequency channel was last searched for the detectable cells and a threshold associated with the corresponding frequency channel.

2. The method of claim 1, wherein the difference corresponding to the selected frequency channel is most negative among the weights associated with the plurality of frequency channels.

3. The method of claim 1, wherein updating the weight associated with the selected frequency channel comprises updating the time elapsed since the selected frequency channel was last searched and updating the threshold associated with the selected frequency channel.

4. The method of claim 1, further comprising:
    detecting a cell on the selected frequency channel;

decoding a system information block associated with the detected cell to determine one or more Public Land Mobile Networks (PLMNs) associated with the detected cell; and
storing the determined PLMNs associated with the cell in a database.

5. The method of claim 1, further comprising:
detecting an idle mode-to-connected mode transition with the device; and
suspending the search over the plurality of frequency channels in response to said idle mode-to-connected mode transition.

6. The method of claim 5, further comprising:
detecting a connected mode-to-idle mode transition within the device; and
resuming the search over the plurality of frequency channels in response to said connected mode-to-idle mode transition.

7. The method of claim 6, wherein resuming the search comprises:
comparing a first cell with a second cell, the first cell being a cell camped on by the device after the connected mode-to-idle mode transition and the second cell being a cell camped on by the device before the idle mode-to-connected mode transition; and
resuming the search over the plurality of frequency channels without re-searching the selected frequency channel if the first cell and the second cell are the same.

8. The method of claim 6, further comprising:
updating the weight associated with the selected frequency channel based on a connected mode duration between the idle mode-to-connected mode transition and the connected mode-to-idle mode transition.

9. The method of claim 6, wherein resuming the search comprises:
comparing a validity time associated with data obtained by searching the selected frequency channel with a current time; and
resuming the search over the plurality of frequency channels without re-searching the selected frequency channel if the validity time is later than the current time.

10. The method of claim 9, wherein the validity time is based on a mobility state of the device, further comprising:
updating the weight associated with the selected frequency channel based on the mobility state of the device.

11. The method of claim 5, further comprising:
resuming the search over the plurality of frequency channels in response to a connected mode-to-idle mode transition within the device without re-searching a frequency channel searched before the idle mode-to-connected mode transition within the device.

12. The method of claim 11, wherein a cell camped on by the device after the connected mode-to-idle mode transition is the same as a cell camped on by the device before the idle mode-to-connected mode transition.

13. The method of claim 11, wherein a validity time associated with data obtained by searching the selected frequency channel before the idle mode-to-connected mode transition is later than a current time.

14. The method of claim 1, further comprising:
determining a number of past searches of the selected frequency channel; and
updating a search depth associated with the selected frequency channel based on the number of past searches, wherein the search depth indicates a maximum number of cells to decode from cells detected on the selected frequency channel.

15. The method of claim 14, further comprising:
increasing the search depth associated with the selected frequency channel if a number of detected cells in a previous search of the selected frequency channel is greater than the search depth currently associated with the selected frequency channel; and
decreasing the search depth associated with the selected frequency channel if the number of detected cells in the previous search of the selected frequency channel is lower than the search depth currently associated with the selected frequency channel.

16. A device, comprising:
non-access stratum (NAS) layer circuitry configured to detect an expiration of a Higher Priority Public Land Mobile Network (HPPLMN) search timer and to send a command to an access stratum (AS) layer in response to the expiration of the HPPLMN search timer;
radio resource control (RRC) circuitry of the AS layer configured to initiate a HPPLMN search in response to the command and to save Public Land Mobile Networks (PLMNs) identified on a searched cell during the HPPLMN search, the RRC circuitry further configured to:
suspend the HPPLMN search upon an idle mode-to-connected mode transition, and
resume the HPPLMN search upon a connected mode-to-idle mode transition without discarding the PLMNs identified on the searched cell when a cell camped on by the device after the connected mode-to-idle mode transition is the same as a cell camped on by the device before the idle mode-to-connected mode transition;
wherein the HPPLMN search comprises searching a selected frequency channel for detectable cells, the selected frequency channel being selected from a plurality of frequency channels according to an order determined by respective weights associated with the plurality of frequency channels,
wherein the respective weights are proportional to respective last visit times of the plurality of frequency channels;
wherein the last visit time of a frequency channel of the plurality of frequency channels is a time elapsed since the corresponding frequency channel was last searched for the detectable cells; and
wherein each weight of the respective weights is based on a difference between the time elapsed since the corresponding frequency channel was last searched for the detectable cells and a threshold associated with the corresponding frequency channel.

17. The device of claim 16, wherein a validity time associated with the PLMNs identified on the searched cell is later than a current time.

18. The device of claim 17, wherein the validity time is related to a mobility state of the device.

19. A method for performing a search over a plurality of frequency channels in a device, comprising:
selecting a frequency channel from the plurality of frequency channels according to an order determined by respective weights associated with the plurality of frequency channels, wherein the respective weights are proportional to respective last visit times of the plurality of frequency channels;
searching the selected frequency channel for detectable cells; and
updating the weight associated with the selected frequency channel in response to said searching, wherein the last visit time of a frequency channel of the plurality of frequency channels is a time elapsed since the corresponding frequency channel was last searched for the detectable cells; and wherein each weight of the respective weights is based on a difference between the time elapsed since the corresponding frequency channel was last searched for the detectable cells and a threshold associated with the corresponding frequency channel.

20. A method for performing a search over a plurality of frequency channels in a device, comprising:

sequentially searching frequency channels of the plurality of frequency channels according to an order determined by respective weights associated with the plurality of frequency channels, wherein the respective weights are proportional to respective last visit times of the plurality of frequency channels;

detecting an idle mode-to-connected mode transition within the device; and suspending the search over the plurality of frequency channels in response to the idle mode-to-connected mode transition within the device, wherein the last visit time of a frequency channel of the plurality of frequency channels is a time elapsed since the corresponding frequency channel was last searched for detectable cells;

wherein each weight of the respective weights is based on a difference between the time elapsed since the corresponding frequency channel was last searched for the detectable cells and a threshold associated with the corresponding frequency channel.

* * * * *